US012157654B2

(12) United States Patent
Boucher, Sr. et al.

(10) Patent No.: US 12,157,654 B2
(45) Date of Patent: Dec. 3, 2024

(54) PICKING MEDIA SHEETS FROM MEDIA TRAYS WITH RETRIES

(71) Applicant: HEWLETT-PACKARD DEVELOPMENT COMPANY, L.P., Spring, TX (US)

(72) Inventors: Peter James Boucher, Sr., Vancouver, WA (US); Jeremy Daniel Barker, Vancouver, WA (US); Peter James Boucher, Jr., Vancouver, WA (US); Juan David Ramos, Vancouver, WA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 40 days.

(21) Appl. No.: 17/484,057

(22) Filed: Sep. 24, 2021

(65) Prior Publication Data

US 2023/0094607 A1 Mar. 30, 2023

(51) Int. Cl.

*B65H 7/06* (2006.01)
*B41J 13/10* (2006.01)
*B65H 1/08* (2006.01)
*B65H 3/06* (2006.01)
*B65H 7/18* (2006.01)

(52) U.S. Cl.

CPC .............. *B65H 7/06* (2013.01); *B41J 13/103* (2013.01); *B65H 1/08* (2013.01); *B65H 3/06* (2013.01); *B65H 7/18* (2013.01); *B65H 2301/363* (2013.01); *B65H 2511/51* (2013.01); *B65H 2511/52* (2013.01); *B65H 2801/03* (2013.01)

(58) Field of Classification Search

CPC ... B65H 7/06; B65H 1/08; B65H 3/06; B65H 7/18; B65H 2301/363; B65H 2511/52; B65H 2801/03; B41J 13/103

See application file for complete search history.

(56) References Cited

U.S. PATENT DOCUMENTS

| | | | | | |
|---|---|---|---|---|---|
| 5,737,682 | A * | 4/1998 | Yamagishi | B65H 3/44 | 271/3.03 |
| 8,152,391 | B2 * | 4/2012 | Asada | G03G 15/234 | 400/188 |
| 2009/0057984 | A1 * | 3/2009 | Matsumoto | B65H 7/02 | 271/10.09 |
| 2009/0057987 | A1 * | 3/2009 | Matsumoto | B65H 3/0607 | 271/114 |

(Continued)

FOREIGN PATENT DOCUMENTS

| | | | |
|---|---|---|---|
| JP | 4-251045 | * | 9/1992 |
| JP | 2935906 | * | 8/1999 |
| WO | WO2023038664 | * | 3/2023 |

OTHER PUBLICATIONS

Machine translation of JP4-251045. (Year: 1992).*

*Primary Examiner* — Thomas A Morrison

(74) *Attorney, Agent, or Firm* — Brooks, Cameron & Huebsch, PLLC

(57) ABSTRACT

An example method for picking a media sheet from a media tray, the method comprising: controlling a media picker to perform a pick procedure to pick the media sheet from the media tray; upon detecting an error condition in the pick procedure, translating the media sheet in a direction within a plane of the media sheet; and controlling the media picker to retry the pick procedure to pick the media sheet from the media tray.

14 Claims, 7 Drawing Sheets

(56) References Cited

U.S. PATENT DOCUMENTS

| | | | | |
|---|---|---|---|---|
| 2015/0368054 | A1* | 12/2015 | Kowase | B65H 7/02<br>271/265.02 |
| 2018/0099827 | A1* | 4/2018 | Tsuboi | B65H 5/06 |
| 2019/0144225 | A1* | 5/2019 | Nishizaka | B65H 3/56<br>271/121 |
| 2019/0344985 | A1* | 11/2019 | Aoki | G03G 15/6511 |

* cited by examiner

PICKING MEDIA SHEETS FROM MEDIA TRAYS WITH RETRIES

BACKGROUND

Printers have media trays containing media sheets for use in printing operations. Many different types of media sheets may be used, and some media sheets may have higher friction between them, causing difficulty in picking a media sheet for a print job.

DETAILED DESCRIPTION

To increase the likelihood of picking a media sheet, printers may make multiple pick attempts. Multiple pick attempts may be used when the media picker initially fails to advance the top media sheet, for example due to dirty or worn-out pick rollers, paper that has high sheet-to-sheet friction and low roller to sheet friction, or stiff sheets catching on separation features in the tray. However, making multiple pick attempts may cause the media picker to wear down the media sheet at the point of contact, resulting in poor traction between the media sheet and the media picker. This may reduce the likelihood that subsequent attempts at picking the media sheet will be successful. Often, manual intervention by a user may allow the media sheet to be shifted slightly and result in a corresponding increase in success of picking the media sheet.

An example printer therefore employs a method of picking a media sheet from a media tray with a retry procedure to increase the likelihood of success of picking the media sheet. In particular, the retry procedure includes translating the media sheet within the plane of the media sheet. Thus, the media picker will contact a different portion of the media sheet during the retry procedure, resulting in the same corresponding increase in success of picking the media sheet.

Figure 1:
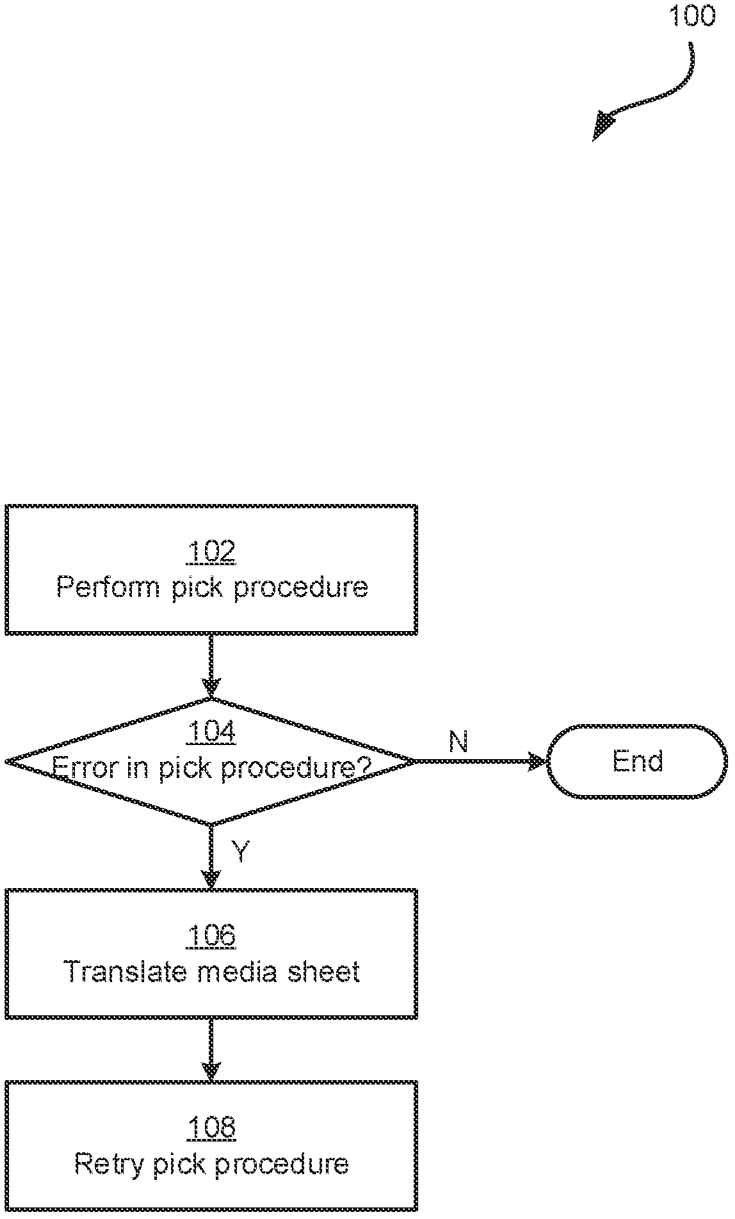
FIG. 1 is a flowchart of an example method of picking media sheets from media tray with retries.

FIG. 1 shows a flowchart of an example method 100 of picking a media sheet from a media tray with a retry procedure to increase the likelihood of success of picking the media sheet. The method 100 is performed by a printer during a print job to pick a media sheet from the media tray of the printer.

At block 102, the printer controls a media picker of the printer to perform a pick procedure to pick the media sheet from the media tray. For example, the media picker may include an arm with a roller which contacts the top-most media sheet in the media tray. Rotation of the roller may cause the top media sheet to be pushed towards a separation wall and fed to other components of the printer to be used in the print job.

At block 104, the printer determines whether there was an error in the pick procedure. For example, the printer may include a sensor to detect whether a media sheet has successfully been received at the other components of the printer to which the media sheets are fed from the media tray. If no media sheet is detected by the sensor, the printer may identify an error in the pick procedure.

In some examples, the pick procedure performed at block 102 may include multiple attempts to pick the media sheet from the media tray. For example, the printer may pick the media sheet multiple times, and may increment an attempt counter when an attempt is unsuccessful. In such examples, an error in the pick procedure may only be identified by the printer when the attempt counter exceeds a predefined threshold (e.g., 3 attempts, 5 attempts, etc.).

If no error is detected in the pick procedure, the printer determines that a media sheet was successfully picked and the method ends. If the printer does detect an error in the pick procedure, the printer proceeds to block 106.

At block 106, upon detecting an error condition in the pick procedure, the printer translates the media sheet in a direction within a plane of the media sheet. That is, the printer may move the media sheet so that it is coplanar with its original position. For example, the printer may move the media sheet forwards, backwards, left or right within the plane of the media sheet, but does not rotate the media sheet or move it up or down, in a direction perpendicular to the plane of the media sheet.

According to one example, to translate the media sheet, the printer may translate the entire media tray in a direction parallel to the plane of the media sheet. For example, the media tray may be supported on a set of rails, or otherwise connected to a media tray transporter which may move the media tray. The printer, and more specifically, the media tray transporter may then move the media tray which therefore moves the media sheet within the media tray. For example, the media tray may be moved away from the separation wall by 2 millimeters, or another suitable amount. In particular, in such examples, by moving the media tray away from the separation wall, the constraint of the separation wall on the media is briefly removed, allowing the retry attempts to have a better chance of succeeding.

In other examples, the printer may translate the media sheet within the media tray. For example, if the media sheet has sufficient space within the media tray, the printer may use a pusher, such as a load stop of the media tray, to push the media sheets away from the separation wall.

At block 108, the printer controls the media picker to retry the pick procedure. The pick procedure may be substantially the same as the pick procedure performed at block 102. For example, the printer may control the media picker to contact the top media sheet and rotate the roller to cause the top media sheet to be pushed towards the separation wall. The pick procedure may also include making multiple attempts to pick the media sheet from the media tray. If the printer detects a further error condition after retrying the pick procedure, the printer may output a pick error notification. For example, the further error condition may be a failure of the pick procedure after the media sheet has been translated.

When the printer retries the pick procedure, the top media sheet is in a different position, and hence the media picker contacts a different portion of the media sheet. Thus, by translating the media sheet, the contact between the media picker and media sheet may be improved. Thus, in comparison to making multiple pick attempts with the media sheet in the same position, the printer may be more effective at picking the media sheet when retrying the pick procedure after the translation of the media sheet within its plane.

Figure 2:
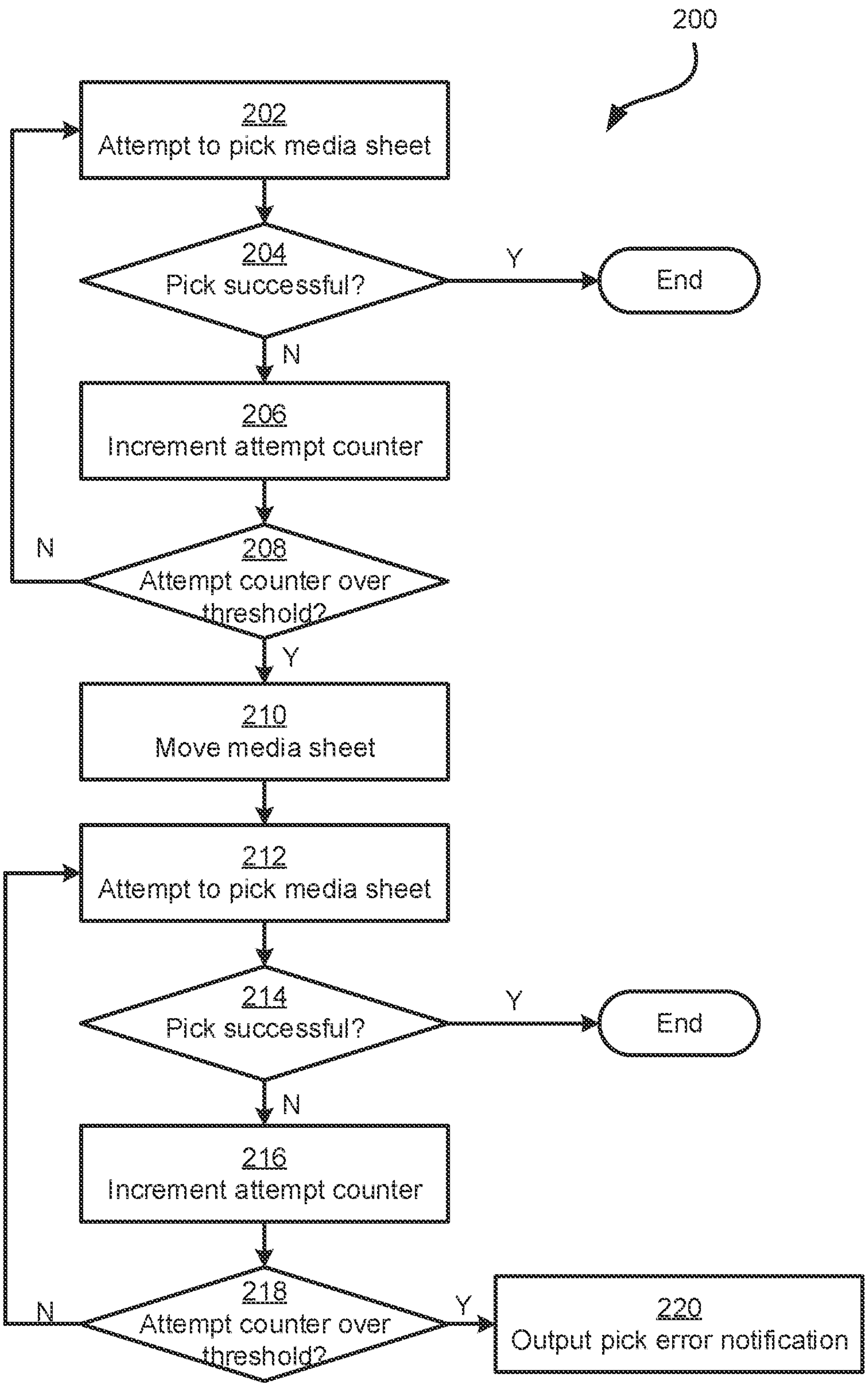
FIG. 2 is a flowchart of another example method of picking media sheets from media tray with retries.

FIG. 2 depicts a flowchart of another example method 200 of picking a media sheet from a media tray with a retry procedure to increase the likelihood of success of picking the media sheet. The method 200 is similar to the method 100 and may also be performed by a printer during a print job to pick a media sheet from the media tray of the printer.

At block 202, the printer controls the media picker to make an attempt to pick a media sheet. For example, the media picker may include an arm with a roller which contacts the top-most media sheet in the media tray. Rotation of the roller may cause the top media sheet to be pushed towards a separation wall and fed to other components of the printer to be used in the print job.

At block 204, the printer determines whether the attempt to pick the media sheet was successful. For example, the printer may include a sensor to detect whether a media sheet has passed a certain point in the media path. If the sensor detects a media sheet, the printer may assume that other components (e.g., rollers, clamps, etc.) of the printer may interact with the media sheet to progress its movement along the media path.

If the determination at block 204 is affirmative, and the pick attempt is determined to be successful, the method 200 ends, since the printer has picked a media sheet for the ongoing print job. If the determination at block 204 is negative, and the pick attempt is determined to not be successful, the printer proceeds to block 206.

At block 206, the printer increments an attempt counter which counts the current number of attempts the printer has made to pick a media sheet.

At block 208, the printer determines whether the attempt counter exceeds a predefined threshold. The predefined threshold defines the maximum number of attempts before an error condition is determined. The predefined threshold may generally allow for multiple attempts, but may otherwise be low (e.g., 3 or 5) to reduce the time to perform the multiple attempts until the error condition is identified.

If the determination at block 208 is negative, and the attempt counter is below the predefined threshold, the printer returns to block 202 to make another attempt at picking the media sheet. If the determination at block 208 is affirmative, and the attempt counter meets or exceeds the predefined threshold, the printer proceeds to block 210.

At block 210, the printer translates the media sheet in a direction within a plane of the media sheet. That is, the printer may move the media sheet so that it is coplanar with its original position. For example, the printer may move the media sheet forwards, backwards, left or right within the plane of the media sheet, but does not rotate the media sheet or move it up or down, in a direction perpendicular to the plane of the media sheet. For example, the printer may translate the entire media tray, or use a pusher or other means to translate the media sheet within the media tray.

After translating the media sheet, the printer may enter a retry procedure, in which the printer retries the pick procedure. In particular, at block 212, the printer controls the media picker to make an attempt to pick a media sheet. The pick attempt may be substantially the same procedure as that performed at block 202. However, since the media sheet has been translated within the plane of the media sheet, the media picker may contact a different portion of the top media sheet. For example, if the multiple pick attempts at blocks 202-208 wore the media sheet at the point of contact between the media sheet and the media picker, the attempt at block 212 may provide a fresh point of contact between the media sheet and the media picker.

At block 214, the printer determines whether the attempt to pick the media sheet was successful, in a similar manner to block 204. If the determination at block 214 is affirmative, and the pick attempt is determined to be successful, the method 200 ends, since the printer has picked a media sheet for the ongoing print job. If the determination at block 214 is negative, and the pick attempt is determined to not be successful, the printer proceeds to block 216.

At block 216, the printer increments the attempt counter which counts the current number of attempts the printer has made to pick a media sheet. In some examples, the attempt counter may be the same one incremented at block 206, and the printer may track the total number of attempts made. In other examples, the printer may have a second attempt counter to track the number of attempts made during the retry procedure, after the media sheet has been moved. In still further examples, the printer may reset the attempt counter to track the number of attempts made during the retry procedure. In such examples, the printer may further store an indicator tracking whether the printer is executing the pick procedure or the retry procedure.

At block 218, the printer determines whether the attempt counter exceeds a predefined threshold. The predefined threshold may be the same predefined threshold used at block 208, or the printer may define a second predefined threshold for the retry procedure. If the determination at block 218 is negative, and the attempt counter is below the predefined threshold, the printer returns to block 212 to make another attempt at picking the media sheet within the retry procedure. If the determination at block 218 is affirmative, and the attempt counter meets or exceeds the predefined threshold, the printer proceeds to block 220.

At block 220, the printer outputs a pick error notification. For example, the notification may be an audio or visual notification output at an output device of the printer (e.g., display screen, speaker, or the like). In other examples, the notification may be a message, such as an email, text message, or the like which is transmitted to another device. The pick error notification may generally notify a user that the printer was unable to pick a media sheet and that manual intervention is recommended to rectify the issue.

As will be appreciated, in other examples, the printer may attempt the retry procedure multiple times. That is, if the first retry procedure does not work, the printer may move the media sheet again, and make multiple attempts to pick the media sheet. In such examples, the printer may store a retry counter tracking the number of retries attempted, until the retry counter exceeds a predefined retry threshold. Thus, by including multiple attempts, as well as retries, wherein the media sheet is moved to a different position, the methods 100 and 200 increase the likelihood of success of picking the media sheet.

Figure 3:
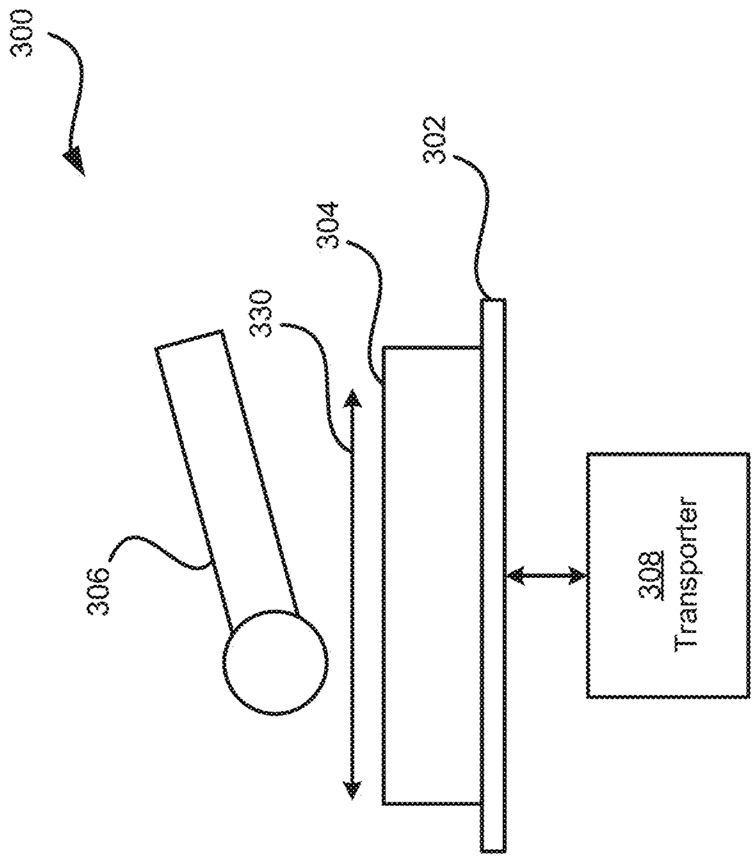
FIG. 3 is a schematic diagram of an example printer for picking media sheets from media tray with retries.

FIG. 3 depicts a schematic diagram of an example printer 300 for picking media sheets from a media tray with retries. The printer 300 includes a media tray 302 to contain media 304 for a printing operation, a media picker 306 to pick a media sheet from the media tray 302, and a media tray transporter 308 to move the media tray 302 to a retry position when the media picker 306 fails to pick the media sheet.

The printer 300 may execute either of the methods 100 or 200 to pick a media sheet from the media tray 302 with retries. In particular, in operation, the media picker 306 may attempt to pick a media sheet from the media tray 302. If the media picker 306 fails to pick the media sheet, the media tray transporter 308 moves the media tray 302 to a retry position. For example, printer 300 may determine that the media picker 306 has failed to pick the media sheet when an attempt counter for a number of attempts to pick the media sheet exceeds a predefined threshold.

The retry position allows the media picker 306 to contact the media sheet at a different portion of the media sheet to provide better contact therebetween, and therefore increase the likelihood of success of picking the media sheet. The media picker 306 is then to retry picking the media sheet from the media tray 302 while the media tray 302 is in the retry position.

Figure 4A:
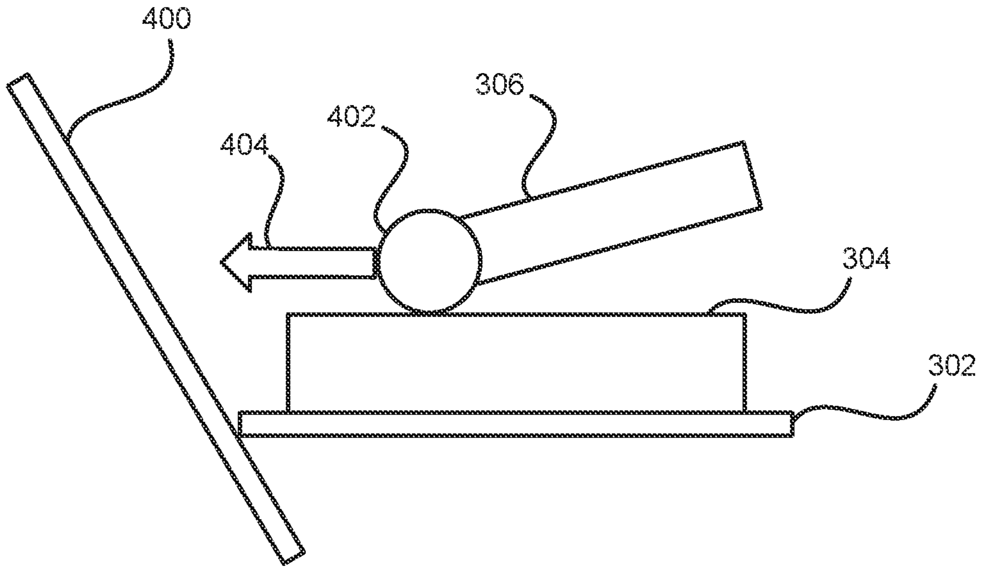
FIGS. 4A and 4B are schematic diagrams of the printer of FIG. 3 with the media tray in an operational position and a retry position, respectively.

For example, referring to FIG. 4A, certain components of the printer 300 are shown in greater detail. In particular, the printer 300 further includes a separation wall 400 and a roller 402 of the media picker. To pick media, the roller 402 is to pick the media sheet in a picking direction 404 towards the separation wall 400.

In some examples, the media tray transporter 308 may translate the media tray 302 in a plane parallel to a plane of the media sheet to the retry position. That is, the movement of the media tray 302 may substantially maintain the top media sheet within the same plane, as described above. For example, the media tray transporter 308 may move the media tray 302 in a direction opposite the picking direction 404, away from the separation wall 400 to the retry position. Translating the media tray 302 within a plane parallel to a plane of the media sheet may include the media tray transporter 308 moving the media tray 302 forwards, backwards, left, or right such that the top media sheet may be substantially maintained within the same plane 330. For example, the media tray 302 may be moved within a parallel plane 330 of the media sheet.

Figure 4B:
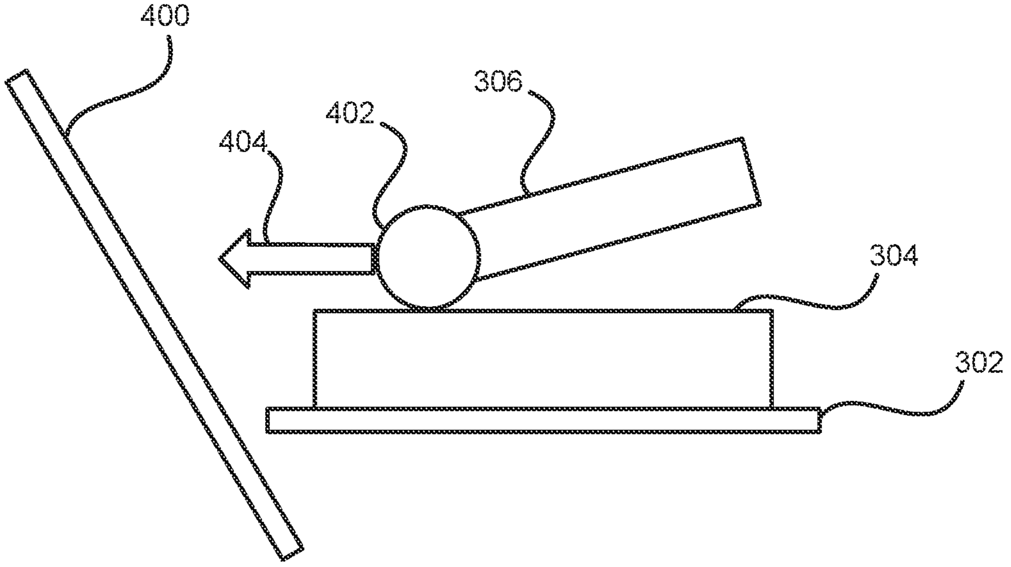

For example, referring to FIG. 4B, the printer 300 is depicted with the media tray 302 in the retry position. As can be seen, the retry position of the media tray 302 is a distance away from the separation wall 400. This distance may be several millimeters (e.g., 2 mm, 3 mm, 5 mm, etc.) or another suitable distance. In particular, the distance may be selected to allow the media picker 306 to operate normally and still contact a portion of the top media sheet in the media tray 302.

In some examples, picking media sheets from a media tray with retries may be implemented in a printer including a printer having the capability to move its media tray.

Figure 5A:
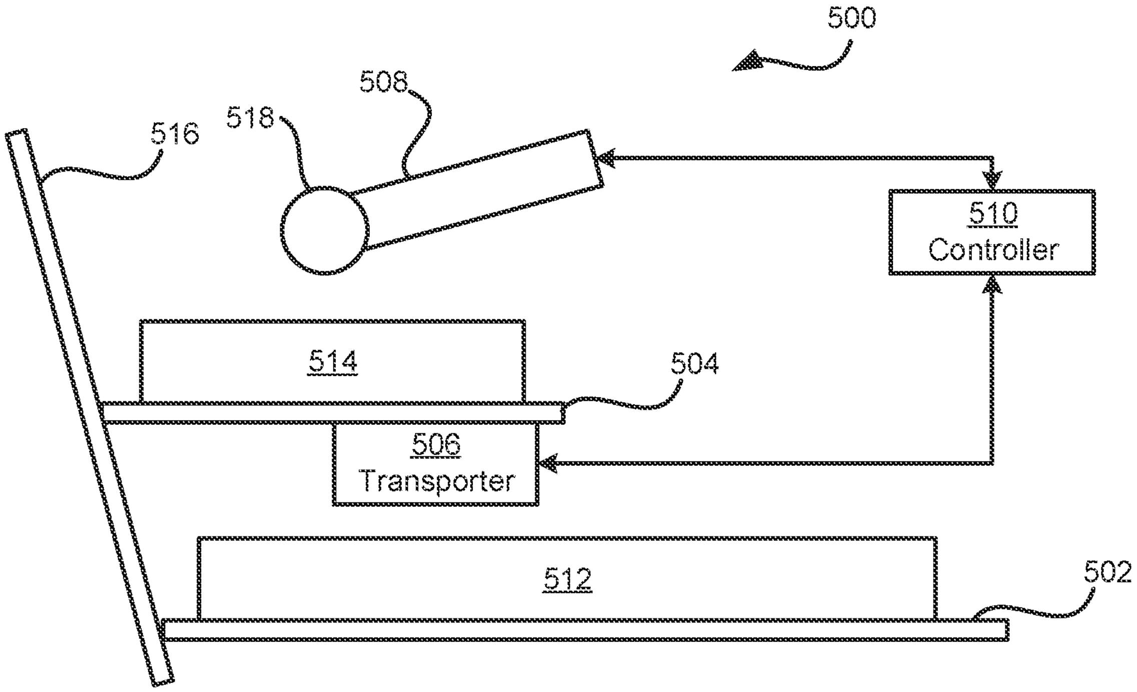
FIGS. 5A and 5B are schematic diagrams of an example printer for picking media sheets from media tray with retries, with the secondary media tray in an operational position and an unobstructive position, respectively.

FIG. 5A shows a schematic diagram of another example printer 500 for picking media sheets from a media tray with retries. The printer 500 includes a primary media tray 502, a secondary media tray 504, a secondary media tray transporter 506, a media picker 508, and a controller 510 interconnected with the media picker 508 and the secondary media tray transporter 506.

The primary media tray 502 is to contain primary media 512 for printing operations. For example, the primary media may be paper for use in printing documents and the like.

The secondary media tray 504 is to contain secondary media 514 for secondary printing operations. For example, the secondary media may be photo paper for use in printing photos, cardstock for use in printing cards, or the like.

The secondary media tray transporter 506 is to transport the secondary media tray 504. In particular, the secondary media tray transporter 506 may transport the secondary media tray 504 at least between an unobstructive position and an operational position. When the secondary media tray transporter 506 transports the secondary media tray 504 to the unobstructive position, the secondary media tray 504 is in a position which allows the media picker 508 to access the primary media tray 502. When the secondary media tray 504 is in the operational position, the secondary media tray 504 obstructs the primary media tray 502, causing the media picker 508 to access the secondary media tray 504.

Figure 5B:
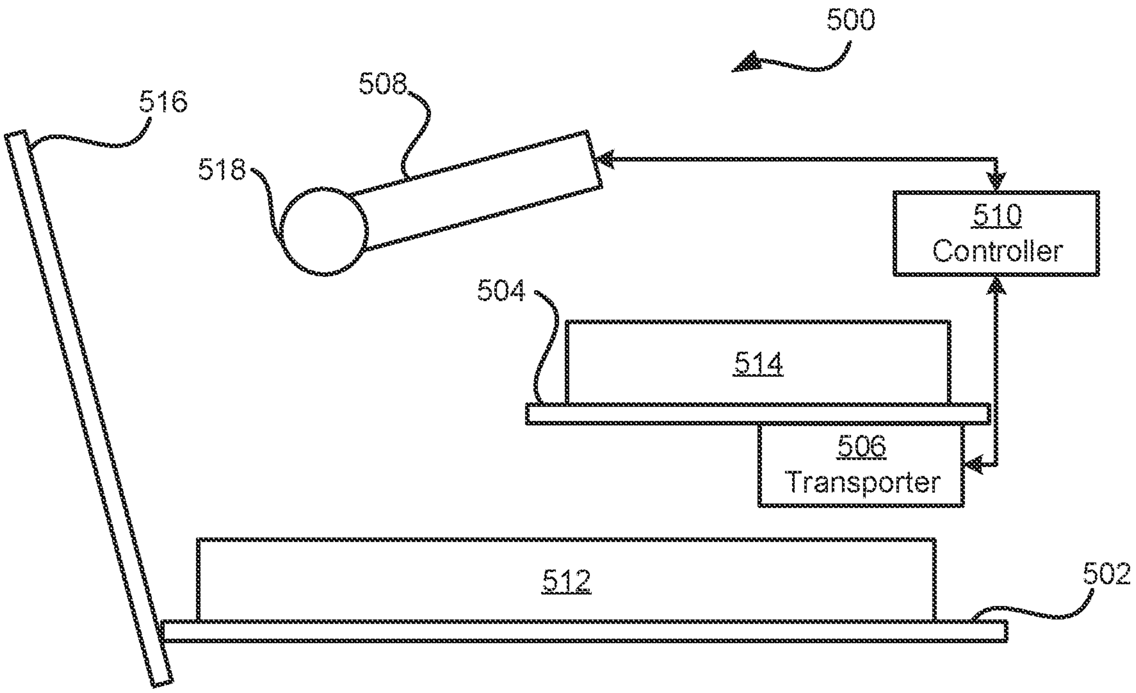

For example, in FIG. 5A, the secondary media tray 504 is in the operational position. In particular, in the operational position, the secondary media tray 504 is abutting a separation wall 516. Referring to FIG. 5B, the secondary media tray 504 is depicted in the unobstructive position. In the unobstructive position, the secondary media tray 504 is coplanar with the operational position, distant from the separation wall 516.

The media picker 508 is to pick media sheets from the primary media tray 502 or the secondary media tray 504. In particular, the media picker 508 is to pick a primary media sheet from the primary media tray 502 when the secondary media tray 504 is in the unobstructive position, since the secondary media tray 504 does not obstruct access to the primary media tray 502 by the media picker 508. The media picker 508 is to pick a secondary media sheet from the secondary media tray 504 when the secondary media tray 504 is in the operational position.

The media picker 508 may include a roller 518 to pick the primary or secondary media sheet in a picking direction towards the separation wall 516.

The controller 510 may be a central processing unit, a microcontroller, a microprocessor, a processing core, or similar device capable of executing instructions. The controller 510 may also include or be interconnected with a non-transitory machine-readable storage medium that may be electronic, magnetic, optical, or other physical storage device that stores executable instructions allowing the controller 510 to perform the functions described herein. For example, the instructions may cause the controller 510 to perform the methods 100 or 200.

In particular, the controller 510 is to control the media picker 508 to perform a pick procedure when the secondary media tray 504 is in the operational position to pick the secondary media sheet. The pick procedure may include actuating the roller 518 to push the secondary media sheet in the picking direction towards the separation wall 516. In some examples, the pick procedure may further include performing multiple attempts at picking the secondary media sheet.

The printer 500 may also include a sensor (not shown) located, for example, adjacent the separation wall 516. The sensor may detect if a media sheet is present part way up the separation wall 516 to determine if the media sheet has been successfully picked.

Upon detecting an error in picking the secondary media sheet, the controller 510 is to control the secondary media tray transporter 506 to move the secondary media tray 504 to a retry position.

Figure 6:
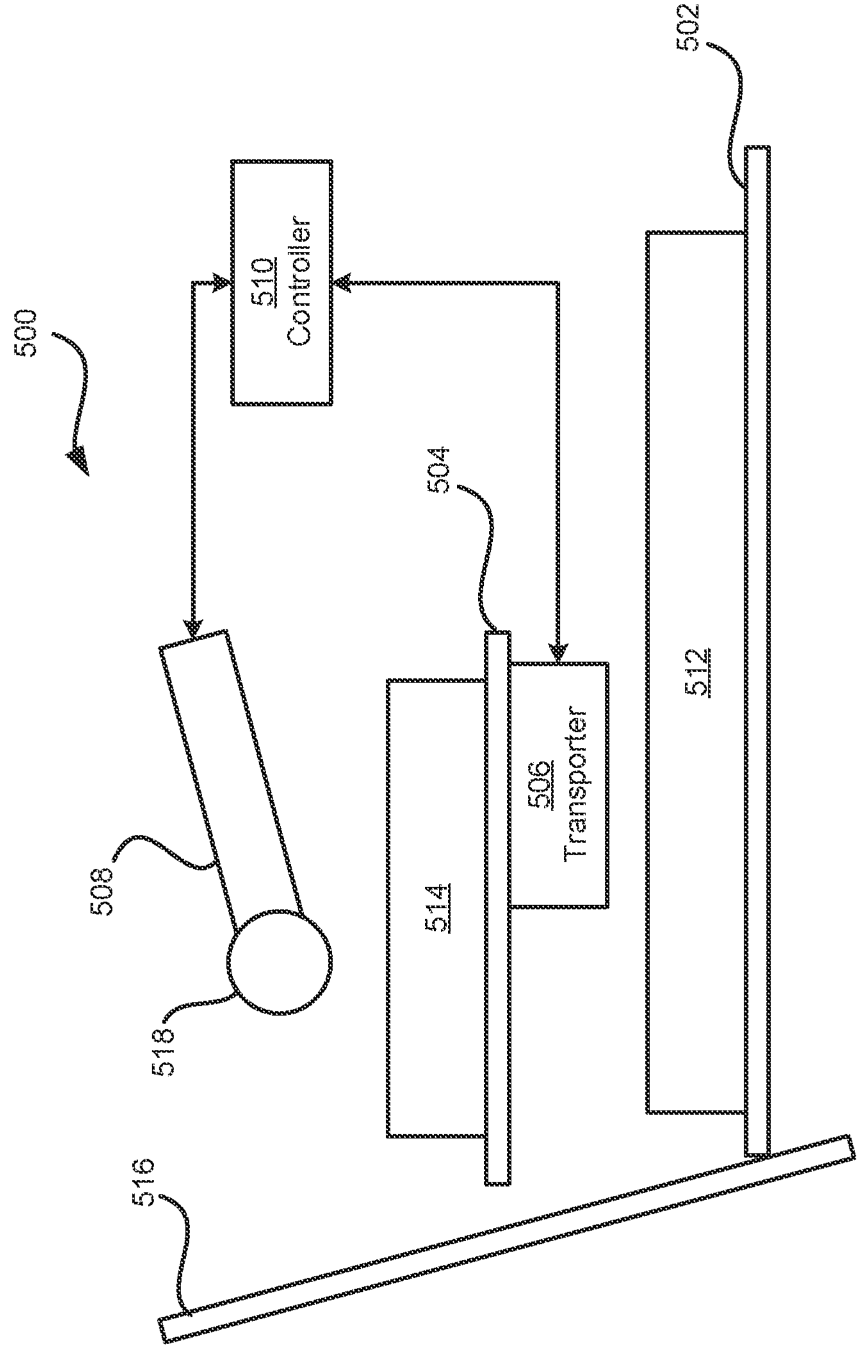
FIG. 6 is a schematic diagram of the printer of FIG. 5 with the secondary media tray in a retry position.

For example, referring to FIG. 6, the secondary media tray 504 is depicted in the retry position. Since the secondary media tray transporter 506 is already capable of moving the secondary media tray 504 between the operational position and the unobstructive position, the retry position may be an intermediate position between the operational position and the unobstructive position. Thus, the retry position may be coplanar with the operational position and the unobstructive position and spaced a distance away from the separation wall 516.

The controller 510 may then control the media picker 508 to perform the pick procedure when the secondary media tray 504 is in the retry position.

Figure 7A:
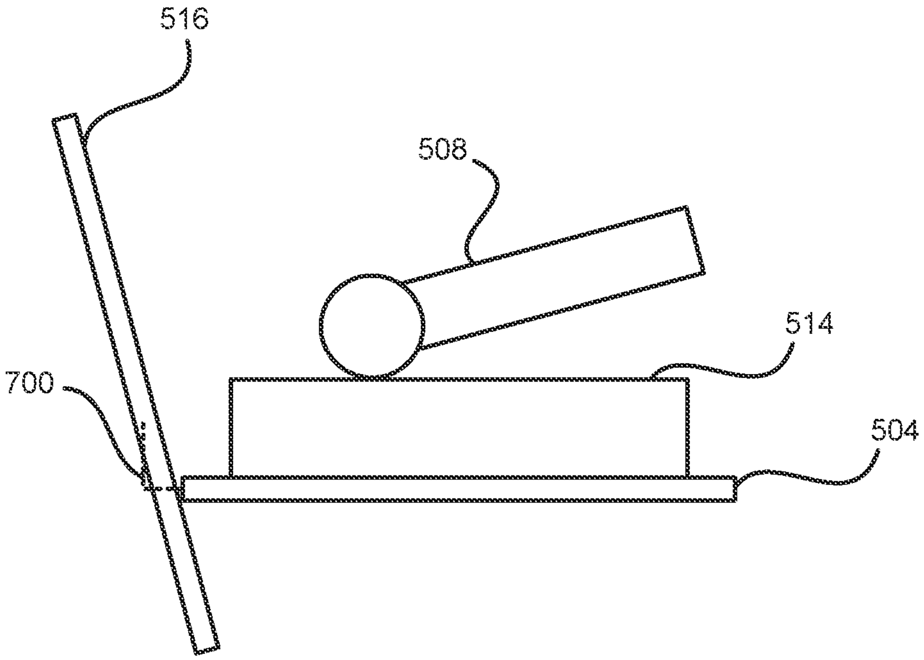
FIGS. 7A and 7B are schematic diagrams of the secondary media tray with a media holder extended into the separation wall when the secondary media tray is in the operational position and the retry position, respectively.

Referring to FIG. 7A, a close up view of the secondary media tray 504 is depicted. In some examples, the secondary media tray 504 may further include a media holder 700 to hold the secondary media 514 to maintain the secondary media 514 in the secondary media tray 504, for example when the secondary media tray 504 is being transported between the operational position and the unobstructive position. The media holder 700 may be received in the separation wall 516 when the media tray is in the operational position.

Figure 7B:
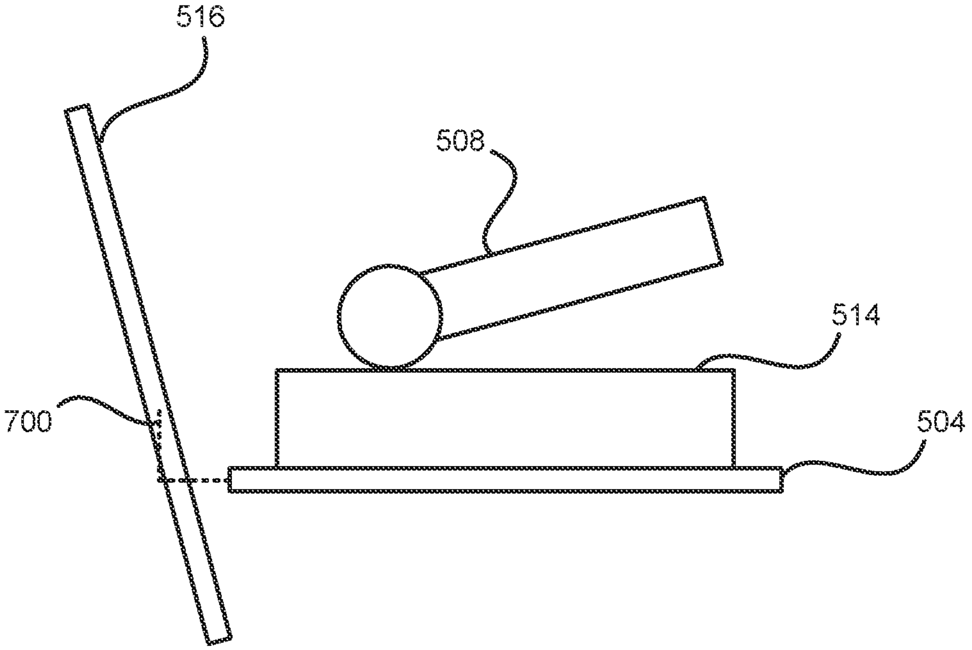

The media holder 700 may also extend from the secondary media tray 504 to remain in the separation wall 516 when the secondary media tray 504 is in the retry position, as can be seen in FIG. 7B. The media holder 700 may thus allow the secondary media 514 to be pushed up the separation wall 516 without catching on the media holder 700, while additionally allowing the secondary media tray 504 to retain the secondary media 514 therein when the secondary media tray 504 is in motion.

As described above, an example printer may employ a method of picking media sheets with retries. In addition to attempting to pick the media sheet multiple times in the usual fashion, when the pick procedure fails, the media sheet is translated within the plane of the media sheet (i.e., moved forwards, backwards, left or right, but not shifted vertically up or down) and the media picker retries the pick procedure. By translating the media sheet, the media picker contacts a different portion of the media sheet which may improve the contact between the media picker and the media sheet.

The scope of the claims should not be limited by the above examples, but should be given the broadest interpretation consistent with the description as a whole.

The invention claimed is:

1. A method for picking a media sheet from a media tray, the method comprising:
- controlling a media picker to perform a pick procedure to pick the media sheet at a first point of contact from the media tray;
- upon detecting an error condition in the pick procedure, translating the media sheet in a direction within a plane of the media sheet, wherein translating the media sheet is performed independently of the media picker by translating the media tray in a direction only horizontally parallel to a plane of the media tray; and
- controlling the media picker to retry the pick procedure to pick the media sheet at a second point of contact different from the first point of contact relative to the media tray.

2. The method of claim 1, wherein performing the pick procedure comprises:
- making a first attempt to pick the media sheet from the media tray; and
- when the first attempt is unsuccessful, incrementing an attempt counter and making a second attempt to pick the media sheet from the media tray.

3. The method of claim 2, wherein detecting the error condition comprises detecting that the attempt counter exceeds a predefined threshold.

4. The method of claim 1, wherein translating the media sheet comprises controlling a pusher to push the media sheet.

5. The method of claim 1, further comprising, upon detecting a further error condition after retrying the pick procedure, outputting a pick error notification.

6. A printer comprising:
- a media tray to contain media for a printing operation;
- a media picker to pick a media sheet from the media tray at a first point of contact when the media tray is in an operational position; and
- a media tray transporter to move the media tray only horizontally parallel to a plane of the media tray and away from a separation wall to a retry position when the media picker fails to pick the media sheet, wherein the retry position is different from the operational position; and
- wherein the media picker is further to retry picking the media sheet from the media tray at a second point of contact different from the first point of contact while the media tray is in the retry position.

7. The printer of claim 6, wherein the media tray transporter is to translate the media tray in a plane parallel to a plane of the media sheet to the retry position.

8. The printer of claim 6, wherein the media picker comprises a roller to pick the media sheet in a picking direction towards a separation wall.

9. The printer of claim 8, wherein the media tray transporter is to move the media tray in a direction opposite the picking direction away from the separation wall to the retry position.

10. The printer of claim 6, wherein the media picker is determined to have failed to pick the media sheet when an attempt counter for a number of attempts to pick the media sheet exceeds a predefined threshold.

11. A printer comprising:
- a primary media tray to contain primary media for a printing operation;
- a secondary media tray to contain secondary media for the printing operation;
- a secondary media tray transporter to transport the secondary media tray;
- a media picker to pick a primary media sheet when the secondary media tray is in an unobstructive position and a secondary media sheet when the secondary media tray is in an operational position, the media picker comprising a roller to pick the primary or secondary media sheet in a picking direction towards a separation wall;
- a controller interconnected with the media picker and the secondary media tray transporter, the controller to:
  - control the media picker to perform a pick procedure when the secondary media tray is in the operational position to pick the secondary media sheet at a first point of contact;
  - upon detecting an error in picking the secondary media sheet, control the secondary media tray transporter to move the secondary media tray to a retry position, wherein the retry position is different from the operational position; and
  - control the media picker to perform the pick procedure when the secondary media tray is in the retry position to pick the secondary media sheet at a second point of contact different from the first point of contact.

12. The printer of claim 11, wherein the operational position of the secondary media tray is abutting the separation wall, and wherein the unobstructive position is coplanar with the operational position, distant from the separation wall.

13. The printer of claim 12, wherein the retry position is an intermediate position between the operational position and the unobstructive position.

14. The printer of claim 13, wherein the secondary media tray includes a media holder which is received in the separation wall when the secondary media tray is in the operational position, and wherein the media holder is to extend from the secondary media tray to remain in the separation wall when the secondary media tray is in the retry position.

* * * * *